United States Patent [19]

Roberts, Sr.

[11] Patent Number: 4,807,384
[45] Date of Patent: Feb. 28, 1989

[54] FISHING-ROD HOLDER HAVING DUAL ACTUATION ALARM

[76] Inventor: Joseph M. Roberts, Sr., P.O. Box 2383, Alameda, Calif. 94501

[21] Appl. No.: 80,328

[22] Filed: Jul. 31, 1987

[51] Int. Cl.$^4$ .............................................. A01K 97/12
[52] U.S. Cl. ......................................... 43/17; 43/21.2
[58] Field of Search ............................. 43/21.2, 17, 16

[56] References Cited

U.S. PATENT DOCUMENTS

| | | | |
|---|---|---|---|
| 2,978,828 | 4/1961 | McQuiston | 43/17 |
| 3,739,514 | 6/1973 | Odney | 43/17 |
| 4,202,125 | 5/1980 | Kovacs | 43/17 |
| 4,202,126 | 5/1980 | Pietrenka | 43/17 |
| 4,398,185 | 8/1983 | Roberts | 43/17 |
| 4,523,403 | 6/1985 | Ivy | 43/21.2 |
| 4,541,196 | 9/1985 | Jershin | 43/21.2 |
| 4,640,038 | 2/1987 | Jershin | 43/21.2 |
| 4,641,453 | 2/1987 | Roberts | 43/21.2 |

Primary Examiner—Gene P. Crosby

[57] ABSTRACT

A fishing-rod holder having dual actuation whereby the pivoting of the fishing-rod holder due to the pull of a fish or due to the release of a fishing line from a weight will actuate an alarm. The fishing-rod holder includes a holster portion for receiving and holding a rod, a first mount member supportably attached to the holster portion, and a second mount member for engaging a fixed support such as the railing of a fishing boat. The first mount member includes a housing for pivotally receiving the second mount member, a tension-adjustment spring for the pivoting of the first mount member on the second mount member, and jacks mounted in the housing and including switches actuated by the pivoting of the first member on the second member. An external alarm device can be provided in the captain's cabin for indicating which of a plurality of fishing-rod holders has indicated the strike of a fish.

12 Claims, 4 Drawing Sheets

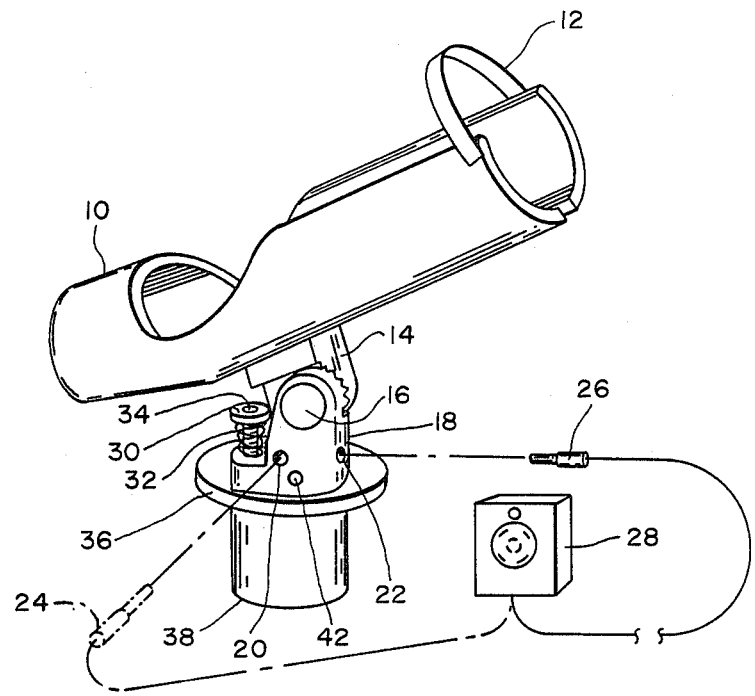
FIG.—1
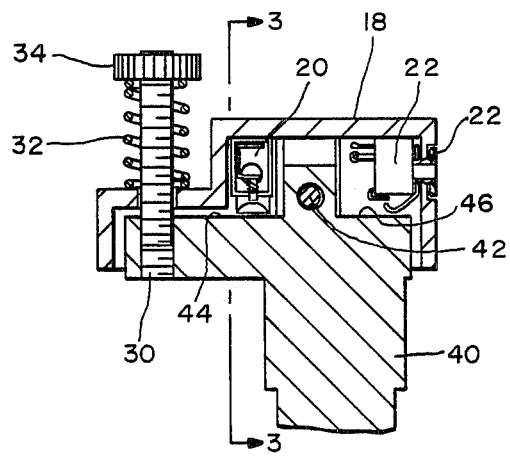
FIG.—2

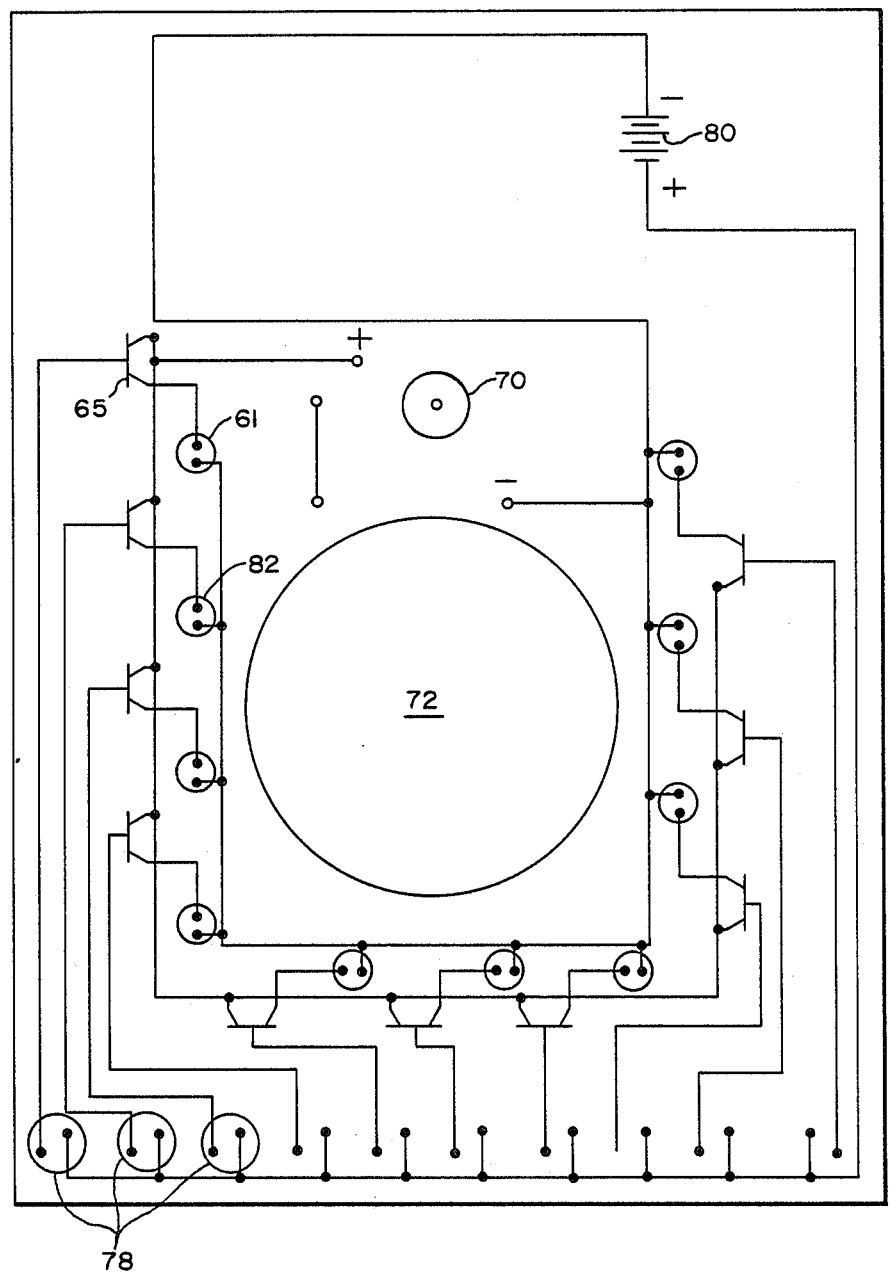
FIG.—5B

FISHING-ROD HOLDER HAVING DUAL ACTUATION ALARM

BACKGROUND OF THE INVENTION

This invention relates generally to fishing equipment, and more particularly the invention relates to a fishing-rod holder and alarm.

My U.S. Pat. No. 4,398,185 discloses a simple and rugged fishing alarm for attaching on a fishing rod and responding to the pull of a fish on the fishing line. Prior art cited during prosecution of the patent application discloses alarm devices built into fishing-rod holders. Attention is directed specifically to Karr U.S. Pat. No. 4,217,720; Kovacs U.S. Pat. No. 4,202,125; and Pientrenka U.S. Pat. No. 4,202,126, in which alarms are actuated by the pivoting of the fishing rod mounted in the holder. Also known are fishing-rod holders specifically designed for mounting on fishing boats.

My U.S. Pat. No. 4,641,453 discloses an improved and versatile fishing rod holder including a holster which readily accommodates both conventional fishing rods and reels and rods with spinning reels. A mount is provided which can provide gunwale, turret, rail and clamp attachment. An audio and visual alarm means integral with the holster responds to pivoting of the holster on the mount. Tension adjustment and pivot angle adjustment are provided in the holster and mount.

SUMMARY OF THE INVENTION

The present invention is directed to an improved fishing-rod holder having dual actuation whereby an alarm is actuated in response to the pull of a fish or in response to the release of the fishing line from a weight extending below a boat, for example, by the pull of a fish. Tension adjustment is provided for the actuation of the alarm In accordance with one feature of the invention, the alarm means includes a plurality of lights corresponding to fishing-rod holders as positioned on a fishing party boat whereby the boat's captain is alerted to a fish strike and can maneuver the boat to try and avoid entanglement of fishing lines.

The invention and objects and features thereof will be more readily apparent from the following detailed description and appended claims when taken with the drawing.

BRIEF DESCRIPTION OF THE DRAWING

FIG. 1 is a perspective view of the fishing-rod holder in accordance with one embodiment of the invention.

FIG. 2 is a section view through the base of the fishing-rod holder of FIG. 1, and illustrates the switches for dual actuation of an alarm.

FIG. 5B is a layout of a printed circuit board for the alarm of FIG. 5A.

DETAILED DESCRIPTION OF ILLUSTRATIVE EMBODIMENT

Figure 3:
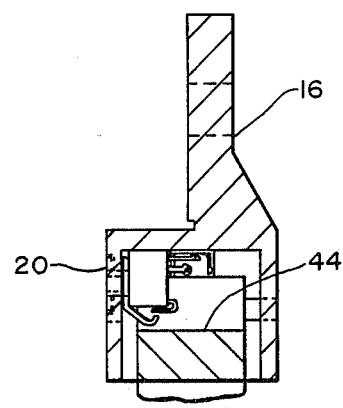
FIG. 3 is a section view through the base of the fishing-rod holder of FIG. 2 taken along the line 3—3 and further illustrates a switch for actuation of an alarm.

Referring now to the drawings, FIG. 1 is a perspective view of a fishing-rod holder and alarm in accordance with one embodiment of the invention. The fishing-rod holder includes a holder portion shown generally at 10 for receiving and supporting a rod and reel with a strap 12 mounted thereon for retaining the rod and reel in the holster. The holster and strap are similar to the structure in my U.S. Pat. No. 4,641,453,supra. The holster 10 includes a member 14 depending therefrom which is pivotally attached to a support by means of a bolt 16.

The support for the holster 10 includes a first mount member 18 which is attached to the member 14 by means of the bolt 16. The mating surfaces of member 18 and member 14 are undulating, thereby facilitating the locking of the two members by means of the bolt 16. Member 18 includes a housing in which are positioned jacks 20 and 22 for receiving plugs as illustrated at 24 and 26. The plugs interface with switches inside of the housing of member 18 and actuate a local alarm 28. The mount further includes a bolt 30 which engages a second mount member (as further illustrated in FIG. 2) with a spring 32 provided between the housing of mount member 18 and a nut 34 for adjusting the tension of the pivoting of rod-holder 10 on the mount. Mount member 18 rests on a support surface 36 such as the rail of a fishing boat inside of a fixed support 38 below the rail.

Referring now to FIG. 2, a section view of the housing of the first mount member 18 is illustrated along with a second mount member 40 which is pivotally attached to the first mount member by means of rod 42. The bolt 30 threadably engages the second support member 40 with the spring and nut 34 adjusting the tension of the pivoting of member 40 and member 18. Member 40 has upper surfaces 44 and 46 which respectively engage switches of jacks 20 and 22 when the rod-holder and first member 18 pivot on the fixed second member 40. For example, the pivoting of rod-holder 10 in a forward direction in response to the pull of a fish will close the switch of jack 22, whereas the release of a fishing line attached to a weight beneath a boat will cause pivoting of the rod-holder 10 backwards and close the switch of jack 20 by engagement of surface 44 therewith.

FIG. 3 is a section view of the mount means of FIG. 2 taken along the line 3—3 and further illustrates the jack 20 and the surface 44 which engages a switch of the jack upon pivoting of the rod-holder.

Figure 4:
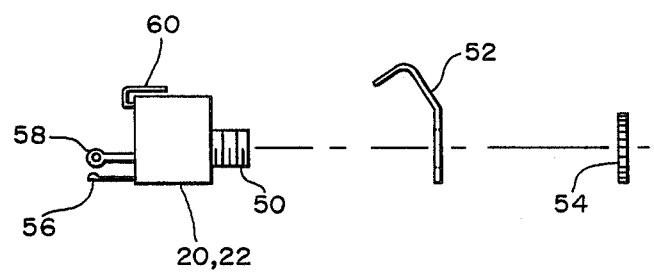
FIG. 4 is an exploded view of a switch in the embodiment of FIGS. 1-3.

FIG. 4 is an exploded view of the jack 20 and jack 22. The jack includes a threaded bolt 50 which receives a shaped resilient metallic member 52 thereon when the jack is mounted to the wall of member 18 by means of nut 54. The bolt 50 is interconnected with one lead 56 of the jack switch, and the other lead 58 is interconnected with a bent lead 60. Engagement of the surfaces 44 and 46 of the second member 40 with the formed member 52 causes the member 52 to contact the lead 60 and thereby closes the switch of the jack. Member 52 and the lead 50 are made of resilient, electrically-conductive metal whereby member 52 flexes out of engagement with member 60 when pessure from the surfaces 44 and 46 of the second member 40 is relieved.

Figure 5A:
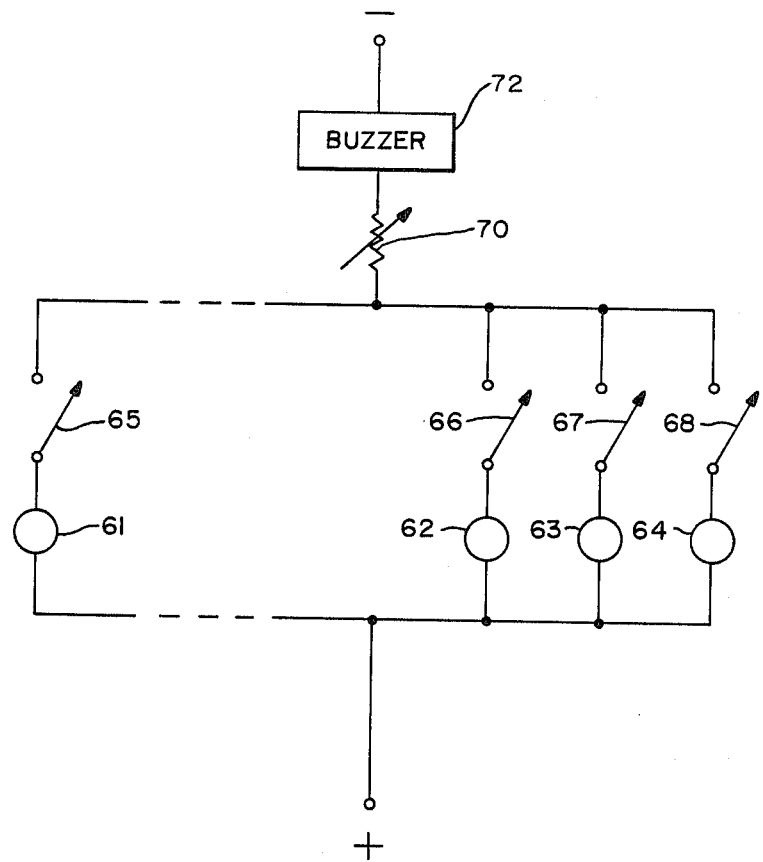
FIG. 5A is a schematic of circuitry for an alarm in accordance with a feature of the invention.

In accordance with a feature of the invention, a remote alarm for the fishing-rod holder can be connectable to a plurality of fishing-rod holders and has an individual alarm for each fishing-rod holder whereby the boat's captain is alerted to a fish strike and can maneuver the boat to try and avoid entanglement of fishing lines. FIG. 5A is a schematic illustrating the alarm, and includes parallel lights 61–64 corresponding to rod-holders, with each light serially connected with a switch of the rod-holder shown at 65–68. The parallel connection of switches and lights are serially connected through a potentiometer 70 and an audio alarm 72 between two electrical potentials. Thus, the closing of a switch by any one rod-holder will complete a circuit, causing actuation of a visual alarm and actuation of the sound alarm.

FIG. 5B is a plan view of a printed circuit board on which the alarm of FIG. 5A is mounted. Like reference numerals are used in the two figures. The cables from the fishing-rod holders are connected to the terminals shown within the circles at 78, and the closing of a switch renders one of the transistor switches conductive. Conductance of a transistor switch 65, for example, energizes a light-emitting diode 61, for example. The potentiometer 70 and buzzer 72 are serially connected with the transistor 65 and LED 61 between the terminals of battery 80. Thus, the alarm is readily assembled on a printed circuit board for mounting in the pilot's house with the light-emitting diodes identifying rod holders on the boat.

Cables from the remote multiple alarm in the captain's cabin can plug directly into the fishing-rod holders, or the cables can plug into the local alarms for the fishing-rod holders as shown at 28 in FIG. 1. In the latter arrangement, the local and remote alarms are serially connected.

The fishing-rod holder in accordance with the present invention has proved to be particularly advantageous when used on fishing boats where both trolling and deep-water fishing may be utilized. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

I claim:

1. A fishing-rod holder comprising
   a holster portion for receiving and holding a rod,
   mount means including a first mount member supportably attached to said holster portion, a second mount member for engaging a fixed support, said first mount member including a housing for pivotally receiving said second mount member, and tension-adjusting means for adjusting the pivoting of said first mount member on said second mount member, and
   alarm switch means inside said housing and actuated by the pivoting of said first mount member on said second mount member.

2. The fishing-rod holder as defined by claim 1 wherein said alarm switch means includes a first switch actuated by the pivoting of said first mount member in one direction and a second switch actuated by the pivoting of said first mount member in an opposite direction.

3. The fishing-rod holder as defined by claim 2 wherein said first mount member is adjustably supportably attached to said holster portion whereby said holster portion can be variably angularly positioned on said mount means.

4. The fishing-rod holder as defined by claim 2 wherein each of said first switch and said second switch comprises a jack for receiving a plug.

5. The fishing-rod holder as defined by claim 4 and further including a remote alarm connectable to a plurality of fishing-rod holders and having an individual alarm for each fishing-rod holder, said remote alarm including a cable and a plug for interconnecting with each fishing-rod holder.

6. The fishing-rod holder as defined by claim 4 and further including a local alarm, said local alarm including a cable and a plug for interconnecting with said fishing-rod holder.

7. The fishing-rod holder as defined by claim 6 and further including a remote alarm means connectable to a plurality of fishing-rod holders and having an individual alarm for each fishing-rod holder, said remote alarm means including a cable and a plug for interconnecting with each fishing-rod holder.

8. The fishing-rod holder as defined by claim 1 and further including an alarm connectable to a plurality of fishing-rod holders and having an individual alarm for each fishing-rod holder, said fishing-rod holder further including a connector for interconnecting said alarm switch means with said alarm.

9. The fishing-rod holder as defined by claim 1 and further including a local alarm, said local alarm including a cable and a plug for interconnecting with said fishing-rod holder.

10. The fishing-rod holder as defined by claim 9 and further including a remote alarm means connectable to a plurality of fishing-rod holders and having an individual alarm for each fishing-rod holder, said remote alarm means including a cable and a plug for interconnecting with each fishing-rod holder.

11. For use with a plurality of fishing-rod holders having switch means actuated by the pull of a fish, an alarm device comprising a plurality of alarm indicators, each indicator corresponding to a fishing-rod holder, said alarm device including a printed circuit board with a plurality of light-emitting diodes mounted thereon and corresponding in number and location on said printed circuit board to the number and location of fishing-rod holders, each light-emitting diode being actuated by switch means in a fishing-rod holder, and a plurality of cables connecting said alarm device to said plurality of fishing-rod holders.

12. The alarm device as defined by claim 11 and further including a sound alarm actuated by each fishing-rod holder.

* * * * *